United States Patent
Higashitani (10) Patent No.: US 8,649,071 B2
(45) Date of Patent: Feb. 11, 2014

(54) IMAGE READING APPARATUS AND IMAGE FORMING APPARATUS PROVIDED WITH THE SAME

(75) Inventor: Masahiro Higashitani, Osaka (JP)

(73) Assignee: Kyocera Document Solutions Inc., Osaka-shi (JP)

( * ) Notice: Subject to any disclaimer, the term of this patent is extended or adjusted under 35 U.S.C. 154(b) by 0 days.

(21) Appl. No.: 13/482,466

(22) Filed: May 29, 2012

(65) Prior Publication Data

US 2012/0307319 A1 Dec. 6, 2012

(30) Foreign Application Priority Data

May 31, 2011 (JP) ................................. 2011-121158

(51) Int. Cl.
*H04N 1/04* (2006.01)

(52) U.S. Cl.
USPC ............................ 358/475; 358/474; 358/509

(58) Field of Classification Search
USPC .......................... 358/474, 475, 509, 471, 484
See application file for complete search history.

(56) References Cited

U.S. PATENT DOCUMENTS

| | | | | |
|---|---|---|---|---|
| 4,803,992 | A * | 2/1989 | Lemelson | 600/342 |
| 5,499,112 | A | 3/1996 | Kawai et al. | |
| 5,905,583 | A | 5/1999 | Kawai et al. | |
| 5,993,378 | A * | 11/1999 | Lemelson | 600/109 |
| 6,426,807 | B1 | 7/2002 | Kawai et al. | |
| 6,512,600 | B1 | 1/2003 | Kawai et al. | |
| 6,628,460 | B1 * | 9/2003 | Ookawa et al. | 359/455 |
| 7,057,778 | B2 | 6/2006 | Kawai et al. | |
| 7,593,139 | B2 | 9/2009 | Kawai et al. | |
| 7,763,331 | B2 * | 7/2010 | Jones et al. | 428/1.31 |
| 7,845,826 | B2 * | 12/2010 | Aylward et al. | 362/243 |
| 8,168,271 | B2 * | 5/2012 | Jones et al. | 428/1.31 |
| 8,389,074 | B2 * | 3/2013 | Jones et al. | 428/1.3 |
| 2009/0218525 | A1 | 9/2009 | Ikeda et al. | |

FOREIGN PATENT DOCUMENTS

| | | |
|---|---|---|
| JP | 6-217084 A | 8/1994 |
| JP | H10-190961 | 7/1998 |
| JP | 2001-005122 | 1/2001 |
| WO | 2006/120932 A1 | 11/2006 |

OTHER PUBLICATIONS

Notice of Reasons for Rejection issued to corresponding JP Application No. 2011-121158 mailed Jul. 31, 2013.

* cited by examiner

*Primary Examiner* — Negussie Worku
(74) *Attorney, Agent, or Firm* — Knobbe Martens Olson & Bear LLP (57) ABSTRACT

The image reading apparatus includes an LED, a light guiding body, and a photoelectric conversion element. The light guiding body has a plurality of prisms for diffusing light. The plurality of prisms includes: at least one first prism that is disposed on an incident surface side in the main scanning direction; and at least one second prism that is disposed on an opposite end side to the incident surface side in the main scanning direction. In the first prism, an angle of a prism incident plane with respect to the main scanning direction is greater than an angle of a prism anti-incident plane with respect to the main scanning direction. In the second prism, an angle of a prism incident plane with respect to the main scanning direction is smaller than an angle of a prism anti-incident plane with respect to the main scanning direction.

10 Claims, 8 Drawing Sheets

IMAGE READING APPARATUS AND IMAGE FORMING APPARATUS PROVIDED WITH THE SAME

INCORPORATION BY REFERENCE

This application is based on and claims the benefit of priority from Japanese Patent Application No. 2011-121158, filed on 31 May 2011, the content of which is incorporated herein by reference.

BACKGROUND

The present disclosure relates to an image reading apparatus that irradiates a document by a side light method of guiding light emitted from an LED in a main scanning direction by a light guiding body to thereby read an image of the document, and an image forming apparatus such as a copy machine provided with the image reading apparatus.

An image forming apparatus, such as a copying machine or the like that forms an image on paper using an electrographic method, includes an image reading apparatus configured to optically read a document image. In recent years, an LED is used as a light source for the image reading apparatus in substitution for a conventional xenon lamp or a cold cathode lamp.

Figure 5:
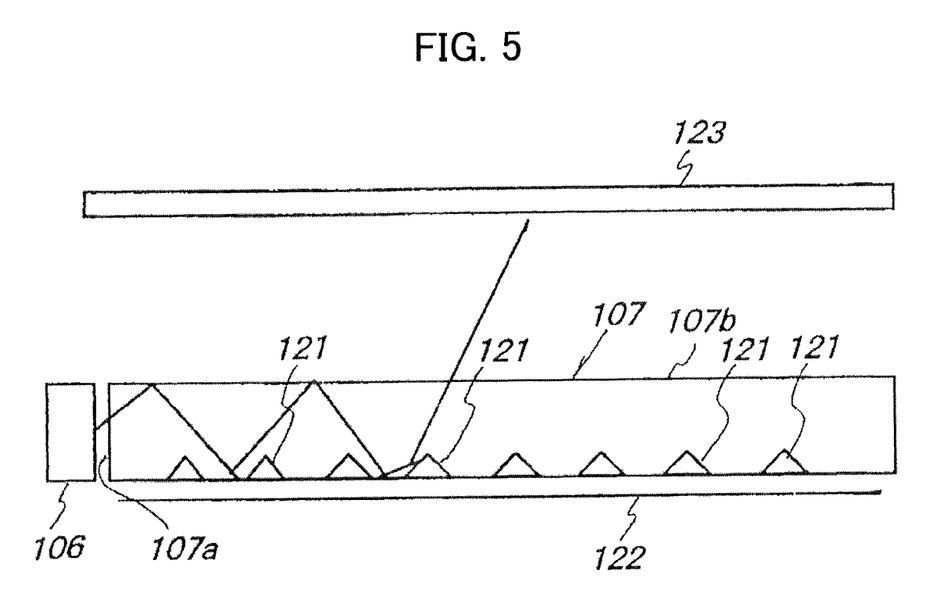
FIG. 5 is a side view of the illumination unit of the image reading apparatus employing a side-light method.
Figure 6:
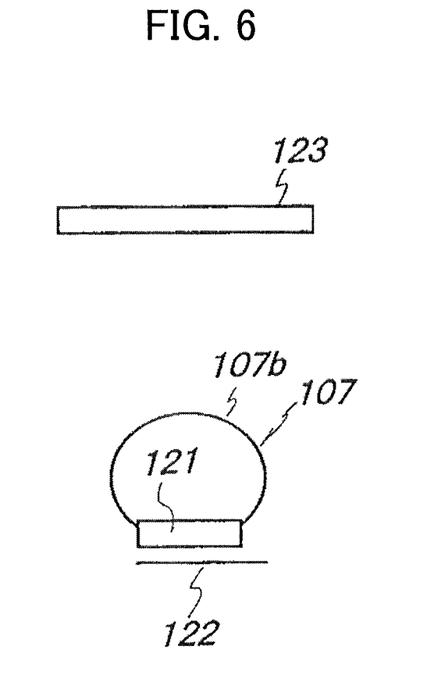
FIG. 6 is a front view of the illumination unit of the image reading apparatus employing a side-light method.

An image reading apparatus using an LED as a light source includes a type that uses a side-light method in which light emitted from an LED disposed on one end in the main scanning direction is introduced into the main scanning direction by a light guiding body. FIGS. 5 and 6 illustrate the configuration of an illumination unit of a conventional image forming apparatus employing a side-light method.

FIG. 5 is a side view of the illumination unit of the image reading apparatus employing a side-light method. FIG. 6 is a front view of the illumination unit. As shown in FIG. 5, in the image reading apparatus employing a side-light method (image forming apparatus), an LED 106 as a light source is disposed on one end in the main scanning direction (the transverse direction (lateral direction) in FIG. 5), and a light guiding body 107 is disposed in the vicinity of the LED 106 along the main scanning direction. An incident surface 107a of one end in the main scanning direction of the light guiding body 107 faces the LED 106. In addition, prisms 121 that include a plurality of V-shaped grooves on a lower surface are disposed on the opposite side to an emission surface 107b on the upper surface of the light guiding body 107 at a suitable interval in the main scanning direction.

A reflector 122 is arranged below the light guiding body 107 along the main scanning direction. A platen glass 123 is provided above the light guiding body 107 to mount the document.

In such an image reading apparatus, when the LED 106 is illuminated, the light is incident from the incident surface 107a of the light guiding body 107 into the light guiding body 107 as illustrated in FIG. 5, and is reflected by an inner surface of the light guiding body 107 and propagated in the main scanning direction. A part of the incident light is reflected by the incident plane of the prism 121, is emitted from the emission surface 107b through the platen glass 123, and illuminates a document that is mounted on the platen glass 123. The light that is not fully reflected by the inner surface of the light guiding body 107 and emitted from an anti-incident surface (lower surface) of the light guiding body 107 is reflected by the reflector 122 and incident again onto the light guiding body 107. Light energy of such light is significantly lost due to Fresnel loss upon reflection by the reflector 122 and second incidence onto the light guiding body 107.

In addition, conventionally, height, pitch and the like of the prisms 121 are set such that illuminance of the light illuminating the document is uniform in the main scanning direction. For example, in a case in which the height of the prisms 121 is constant, the pitch of the prisms is set to be greater in the vicinity of the LED 106 and to decrease as the distance from the LED 106 increases.

On the other hand, in a case in which the pitch of the prisms 121 is constant, the height of the prisms is set to be smaller in the vicinity of the LED 106 and to increase as the distance from the LED 106 increases.

The light that is emitted from the LED 106 and incident upon the light guiding body 107 includes: direct light that is reflected once by the inner surface of the light guiding body 107 and then incident upon the prisms 121; and indirect light that is reflected at least twice by the inner surface of the light guiding body 107 and then incident upon the prisms 121. In the vicinity of the LED 106, the proportion of the direct light is greater than that of the indirect light. And, as the distance from the LED 106 increases, the proportion of the indirect light increases compared to that of the direct light.

Here, as the direct light has a short incident distance to a diffusion region and is high in energy, the illuminance of a region in the vicinity of the LED 106 is high and an illuminance distribution in a vertical scanning direction becomes sharp.

Figure 7:
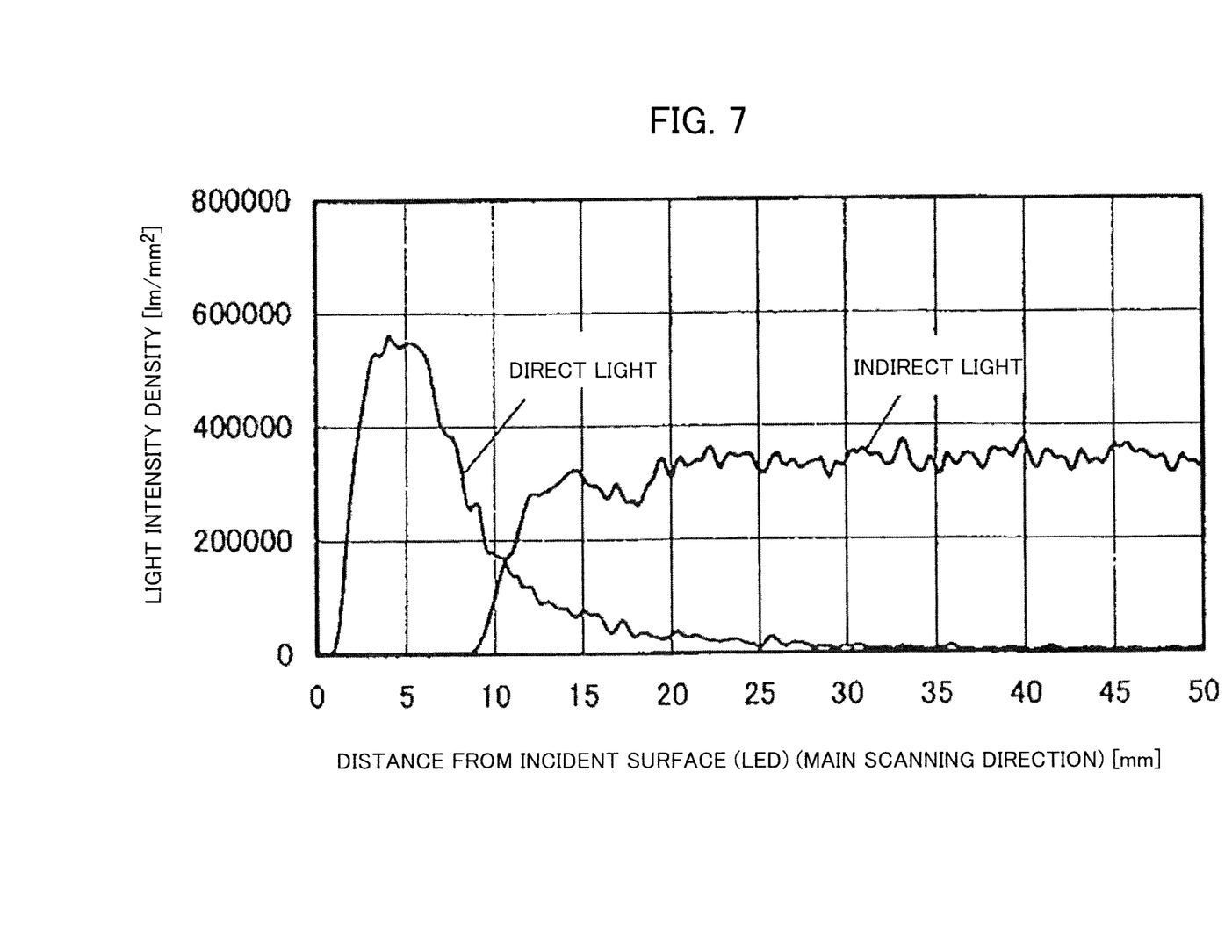
FIG. 7 is a diagram illustrating energy distribution (light intensity density) of the direct light and the indirect light in the main scanning direction in the image reading apparatus employing a side-light method.
Figure 8:
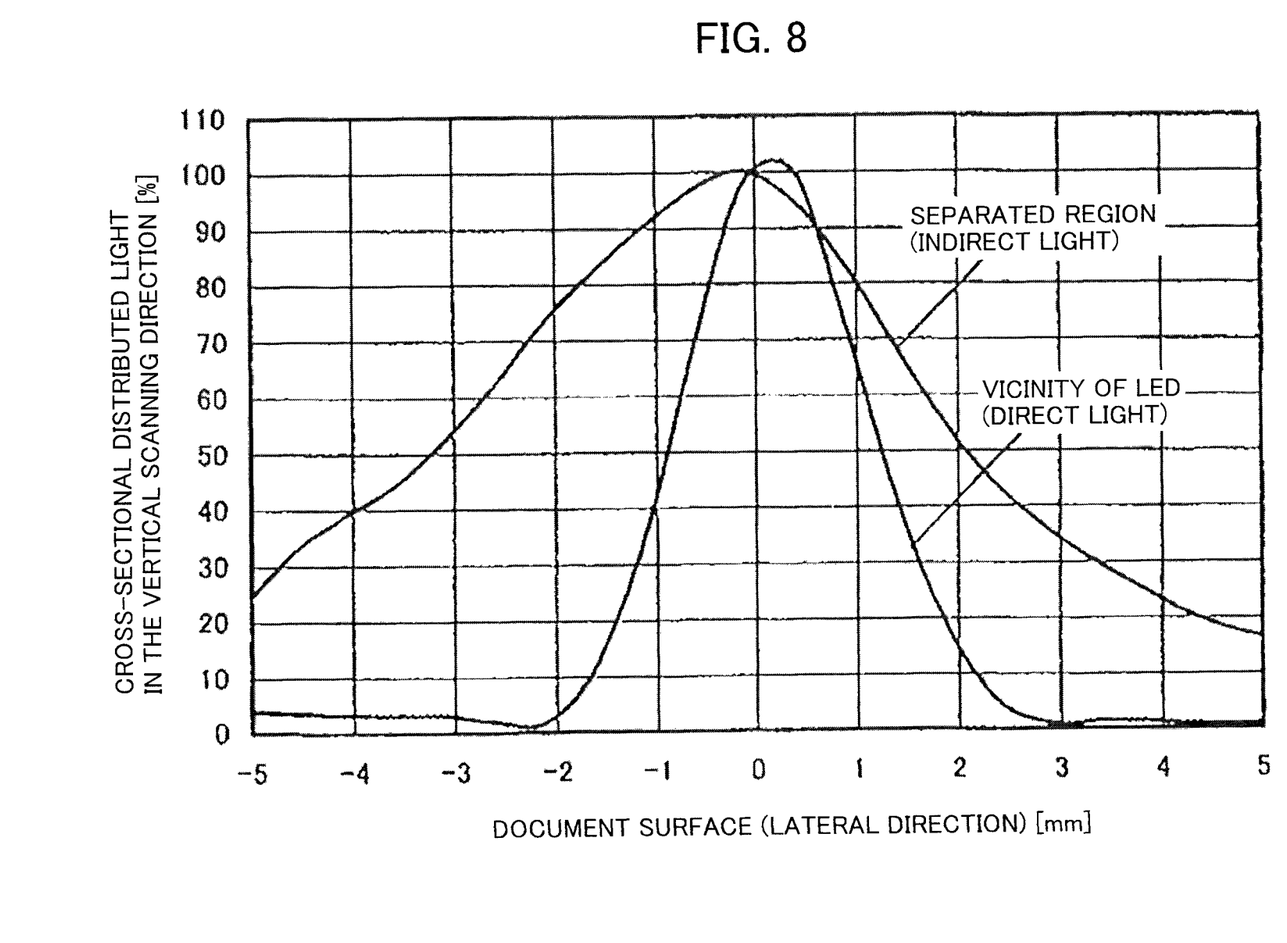
FIG. 8 is a diagram illustrating cross-sectional distributed light in the vertical scanning direction in the vicinity of the LED and in a separated region located away from the LED, in the image reading apparatus employing a side-light method.

FIG. 7 shows energy distribution (light intensity density) of the direct light and the indirect light in the main scanning direction; and FIG. 8 shows cross-sectional distributed light in the vertical scanning direction in the vicinity of the LED and in a separated region located away from the LED.

As shown in FIG. 8, the cross-sectional distributed light in the vertical scanning direction in the vicinity of the LED is sharply distributed in a steep and narrow mountain shape. Given this, if the document is spaced away from the platen glass in the vicinity of the LED 106, the light intensity at the part of the document is significantly reduced and image fogging may be caused due to variation in image density.

As a related art to the image reading apparatus employing the side-light method, proposed is a configuration of arranging a central position of the LED out of alignment with a normal line in a center of width in a lateral direction of the diffusion region, in order to uniformly illuminate a whole document illumination position along the main scanning direction. According to the related art, the direct light that is directly incident from the LED upon the diffusion region is reduced and the indirect light that is reflected by the inner surface of the light guiding body except for the diffusion region can be increased, thereby allowing the light to propagate from the LED to a position away therefrom, and improving unevenness of illuminance in the main scanning direction.

However, in the configuration of the related art, there is significant influence of the direct light in the vicinity of the LED and it is difficult to broaden the distributed light in the vertical scanning direction on the surface of the document, leading to a problem of variation in image density due to the document being spaced away from the platen glass.

SUMMARY

The image reading apparatus according to the present disclosure includes an LED, a light guiding body, and a photoelectric conversion element.

The LED illuminates the document.

The light guiding body is disposed along the main scanning direction. The light guiding body has an incident surface formed on a first end side and arranged to face the LED, an emission surface formed on a document side to extend in the main scanning direction, and a plurality of prisms for diffusing light that is aligned in the main scanning direction on a side facing the emission surface of the light guiding body, the light guiding body guiding light, which is emitted by the LED and incident upon the incident surface, in the main scanning direction and emitting the light from the emission surface. The plurality of prisms in the light guiding body includes: at least one first prism that is disposed on an incident surface side in the main scanning direction; and at least one second prism that is disposed on an opposite end side to the incident surface side in the main scanning direction. In the first prism, an angle of a prism incident plane with respect to the main scanning direction is greater than an angle of a prism anti-incident plane with respect to the main scanning direction. In the second prism, an angle of a prism incident plane with respect to the main scanning direction is smaller than an angle of a prism anti-incident plane with respect to the main scanning direction.

The photoelectric conversion element converts light that is emitted from the emission surface of the light guiding body and reflected by the document into an electrical signal to thereby read an image of the document.

The image forming apparatus according to the present disclosure includes an image reading apparatus.

The image reading apparatus according to the present disclosure includes an LED, a light guiding body, and a photoelectric conversion element.

The LED illuminates the document.

The light guiding body is disposed along the main scanning direction. The light guiding body has an incident surface formed on a first end side and arranged to face the LED, an emission surface formed on a document side to extend in the main scanning direction, and a plurality of prisms for diffusing light that is aligned in the main scanning direction on a side facing the emission surface of the light guiding body, the light guiding body guiding light, which is emitted by the LED and incident upon the incident surface, in the main scanning direction and emitting the light from the emission surface. The plurality of prisms in the light guiding body includes: at least one first prism that is disposed on an incident surface side in the main scanning direction; and at least one second prism that is disposed on an opposite end side to the incident surface side in the main scanning direction. In the first prism, an angle of a prism incident plane with respect to the main scanning direction is greater than an angle of a prism anti-incident plane with respect to the main scanning direction. In the second prism, an angle of a prism incident plane with respect to the main scanning direction is smaller than an angle of a prism anti-incident plane with respect to the main scanning direction.

The photoelectric conversion element converts light that is emitted from the emission surface of the light guiding body and reflected by the document into an electrical signal to thereby read an image of the document.

DETAILED DESCRIPTION

The configuration of the embodiments according to the present disclosure will be described below making reference to the attached figures.

Figure 1:
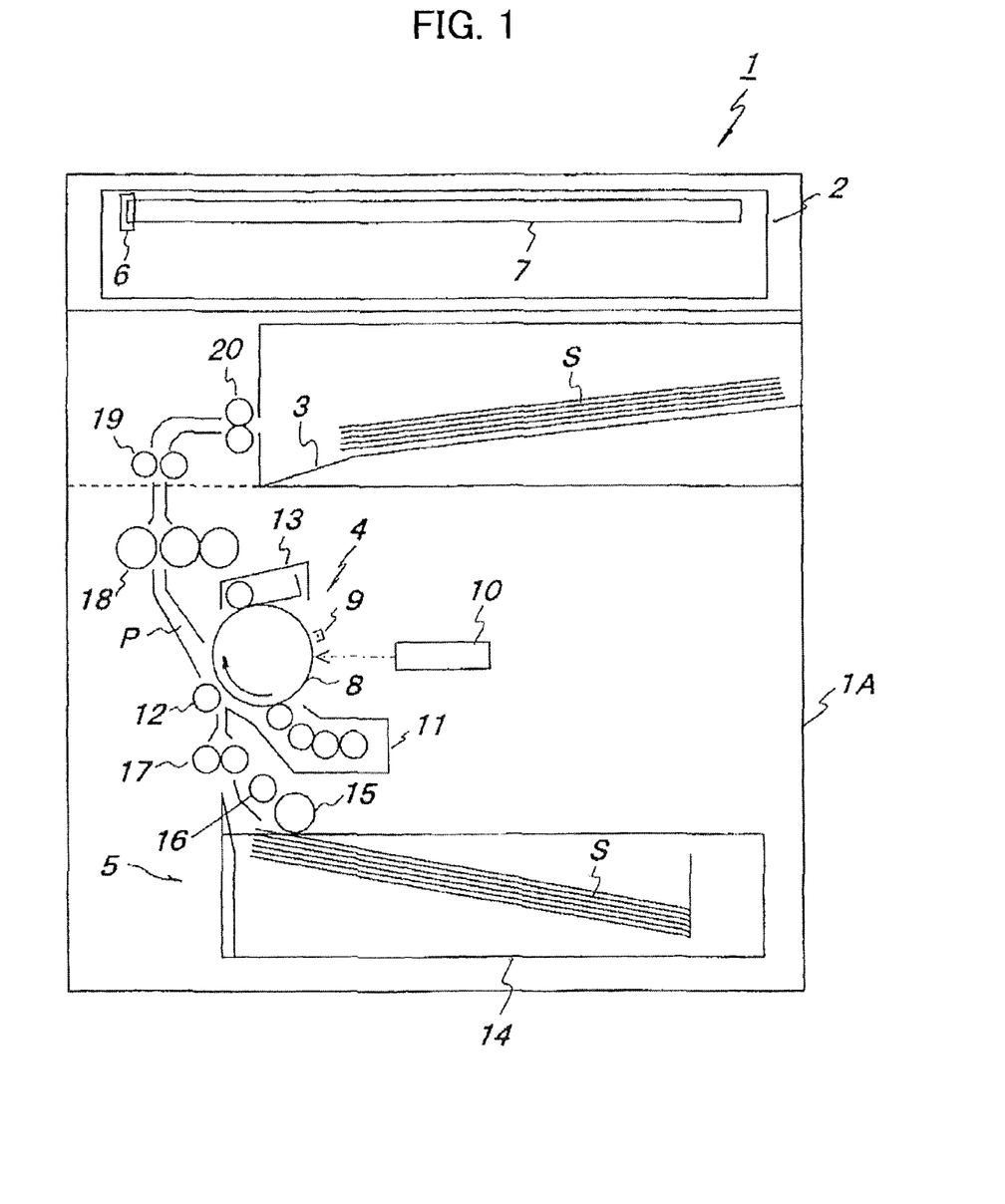
FIG. 1 is a side sectional view of an image forming apparatus according to the present disclosure.

FIG. 1 is a side sectional view of an image forming apparatus according to the present disclosure.

As illustrated in FIG. 1, the image forming apparatus is a monochrome copying machine. The image forming apparatus 1 includes an apparatus main body 1A, and an image reading apparatus 2 according to the present disclosure that is disposed above the apparatus main body 1A. An ejected paper tray 3 is disposed below the image reading apparatus 2. The image forming unit 4 is disposed on an inner portion of the apparatus main body 1A. A sheet feeding unit 5 is disposed below the apparatus main body 1A.

The image reading apparatus 2 is configured to include an LED (Light emitting diode) 6 that is disposed on one end in the main scanning direction (transverse direction of FIG. 1), and a transparent light guiding body 7 that guides light that is incident from the incident surface 7a that faces the LED 6 in the main scanning direction. The image reading apparatus 2 is an apparatus for illuminating a document (original) using a side light method to thereby read an image of the document.

The white-light LED 6 and the light guiding body 7 are configured to displace integrally with a carriage. The LED 6 and the light guiding body 7 are supported by a carriage (not illustrated) to undergo reciprocating motion integrally in the vertical scanning direction (the direction that is vertical to the surface of the sheet of FIG. 1).

Although not shown in the drawings, the image reading apparatus 2 is provided with an imaging lens for forming an image based on reflected light that is reflected from the document and a photoelectric conversion element for reading the image formed by the imaging lens by conversion into an electrical signal.

As described above, the image reading apparatus 2 according to the present embodiment includes the LED 6, the light guiding body 7, and the photoelectric conversion element.

The LED 6 illuminates the document.

The light guiding body 7 is disposed along the main scanning direction. The light guiding body 7 has an incident surface 7a formed on a first end side and arranged to face the LED 6, an emission surface 7b formed on a document side to extend in the main scanning direction, and a plurality of prisms 21 for diffusing light that is aligned in the main scanning direction on a side facing the emission surface 7b of the light guiding body 7. The light guiding body 7 guides light, which is emitted by the LED 6 and incident upon the incident surface 7a, in the main scanning direction and emits the light from the emission surface 7b. The prism 21 is described later in detail.

The photoelectric conversion element converts light that is emitted from the emission surface 7b of the light guiding body 7 and reflected by the document into an electrical signal to thereby read an image of the document. The photoelectric conversion element converts light that is emitted from the emission surface 7a and reflected by the surface of the document into an electrical signal. The photoelectric conversion element generates an electrical signal including image information.

The image forming unit 4 forms an image using an electrographic method. The image forming unit 4 includes: a photoreceptor drum 8 that is rotatably disposed as an image supporting body; and an electric charger 9, a laser scanner unit (LSU) 10, a developing device 11, a transfer roller 12 and a cleaning device 13 that are disposed on the periphery of the photosensitive drum 8. The image forming unit 4 forms an image read by the image reading apparatus 2 on the surface of the paper (image formation target material). The image forming unit 4 forms an image on the surface of the paper based on the electrical signal (image information) output by the photoelectric conversion element.

The sheet feeding unit 5 includes a detachable sheet cassette 14, a pick-up roller 15 and a paper feed roller 16 that are disposed in the vicinity of the sheet cassette 14. A plurality of sheets of paper S is stacked and stored in the sheet cassette 14. The paper S stored in the sheet cassette 14 is picked up from the uppermost sheet by the pick-up roller 15, and fed to the paper path P by the paper feed roller 16.

The paper path P extends upwardly from the sheet feeding unit 5 to the ejected paper tray 3. A registration roller 17 (paper stop roller), the transfer roller 12, a fixing device 18, a conveyance roller 19, and a discharge roller 20 are disposed in this order vertically from below (from the upstream side of the conveyance direction of the paper S) on the paper path P.

The image forming operation of the image forming apparatus 1 configured as described above will be described hereinafter.

When the image forming operation is commenced, the photosensitive drum 8 in the image forming unit 4 is driven to rotate in the direction of the arrow (clockwise direction) in FIG. 1 by a drive means (not illustrated), and a uniform predetermined potential is applied to the surface of the drum by the electric charger 9. A document image is read in the image reading apparatus 2 as described below, a laser beam is outputted from the laser scanner unit 10 based on the electrical signal sent from the image reading apparatus 2 to expose and scan the surface of the photosensitive drum 8 and thereby form an electrostatic latent image on the photosensitive drum 8 in response to the image information. The electrostatic latent image formed on the photoreceptor drum 8 is visualized as a toner image by developing a toner as a developer by the developing device 11.

Furthermore, the paper S stored in the sheet cassette 14 of the sheet feeding unit 5 is picked up from the uppermost sheet by the pick-up roller 15, and fed to the paper path P by the paper feed roller 16. The paper S that is fed to the paper path P in this manner is conveyed in the paper path P by the registration roller 17, and after being in a temporary stand-by state in the registration roller 17, is fed to the image forming unit 4 at a predetermined timing that is synchronized with the toner image on the photosensitive drum 8.

The paper S that is supplied to a transfer nip between the photoreceptor drum 8 and the transfer roller 12 in the image forming unit 4 is pressed against and conveyed onto the photoreceptor drum 8 by the transfer roller 12 to thereby transfer the toner image on the photoreceptor drum 8 onto the paper surface. The paper S onto which the toner image has been transferred is conveyed to the fixing device 18 and heat and pressure are applied by passing through the fixing nip of the fixing device 18 to thereby fix the toner image. Residual toner (excess transfer toner) present on the surface of the photoreceptor drum 8 after transfer of the toner image to the paper S is removed by the cleaning device 13, and the photoreceptor drum 8 with a cleaned surface is ready for the next image forming operation.

The paper S with a toner image fixed to the surface by the fixing device 18 is conveyed to the discharge roller 20 along the paper path P by the conveyance roller 19 and is discharged to the ejected paper tray 3 by the discharge roller 20 to thereby complete a series of image forming operations. Image reading apparatus A configuration of the image reading apparatus 2 according to the present disclosure will be described hereinafter with reference to FIGS. 2, 3A and 3B.

Figure 2:
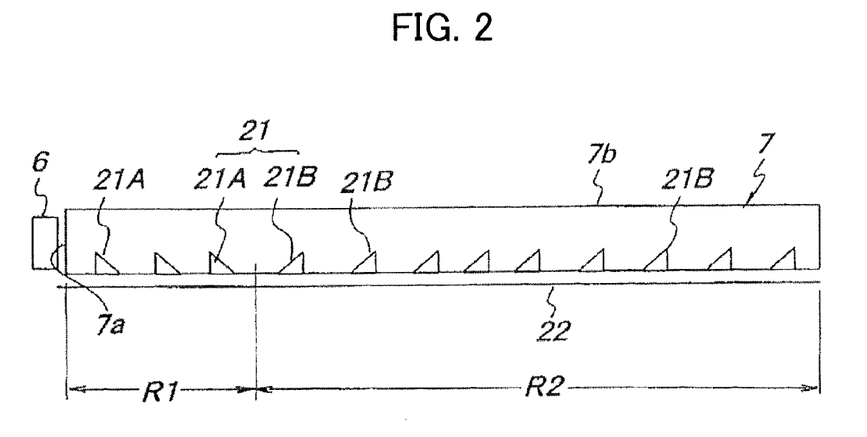
FIG. 2 is a side view of the illumination portion of the image reading apparatus according to the present disclosure.
Figure 3A:
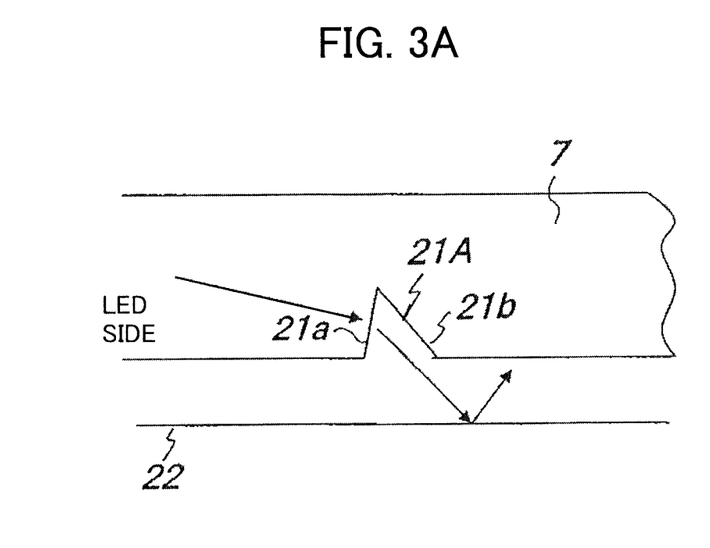
FIG. 3A is a partial side sectional view illustrating a refractive state of light in the first prism of the light guiding body of the image reading apparatus according to the present disclosure.
Figure 3B:
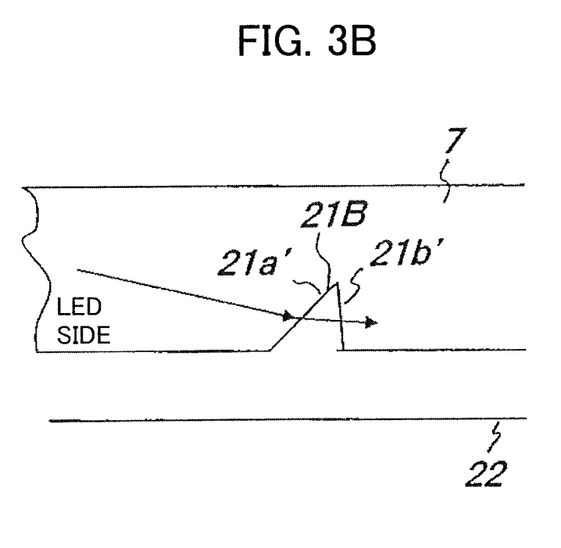
FIG. 3B is a partial side sectional view illustrating a refractive state of light in the second prism of the light guiding body of the image reading apparatus according to the present disclosure.

FIG. 2 is a side view of the illumination portion of the image reading apparatus according to the present disclosure. FIG. 3A is a partial side sectional view illustrating a refractive state of light in the first prism of the light guiding body of the image reading apparatus according to the present disclosure. FIG. 3B is a partial side sectional view illustrating a refractive state of light in the second prism of the light guiding body of the image reading apparatus according to the present disclosure.

As shown in FIG. 2, the light guiding body 7 according to the present embodiment is elongated in the main scanning direction. The light guiding body 7 is a cylindrical light guiding body that is elongated in the main scanning direction.

The light guiding body 7 that is elongated in the main scanning direction is disposed such that the incident surface 7a on a first end face thereof faces the LED 6. The light guiding body 7 has a plurality of V-groove shaped light-scattering prisms 21 that is arranged at predetermined intervals in the main scanning direction, on a lower face side facing a top face side (document side, platen glass side), which is the emission surface 7b.

The plurality of prisms 21 in the light guiding body 7 includes at least one first prism 21A and at least one second prism 21B. In the first prism 21A, an angle of a prism incident plane 21a with respect to the main scanning direction is greater than an angle of a prism anti-incident plane 21b with respect to the main scanning direction. In the second prism 21B, an angle of a prism incident plane 21a' with respect to the main scanning direction is smaller than an angle of a prism anti-incident plane 21b' with respect to the main scanning direction.

Among the plurality of prisms 21 provided in the light guiding body 7, in the first prism 21A in a region R1 in the vicinity of the LED 6, the angle of the prism incident plane 21a is set to be greater than the angle of the prism incident plane 21a' of the second prism 21B that is a different prism (prism in a region R2 located away from the LED 6).

In the present embodiment, the angle of the prism incident plane 21a and the angle of the prism anti-incident plane 21b of the first prism 21A in the region R1 in the vicinity of the LED 6 are set to be equal respectively to the angle of the prism anti-incident plane 21b' and the angle of the prism incident plane 21a' of the second prism 21B in the region R2 that is a region except for the region R1.

In other words, in the present embodiment, the angle of the prism incident plane 21a with respect to the main scanning direction in the first prism 21A is the same as the angle of the prism anti-incident plane 21b' with respect to the main scanning direction in the second prism 21B. In addition, the angle of the prism anti-incident plane 21b with respect to the main scanning direction in the first prism 21A is the same as the angle of the prism incident plane 21a' with respect to the main scanning direction in the second prism 21B.

In other words, a shape of the first prism 21A in the vicinity of the LED 6 is symmetric to a shape of the second prism 21B in the main scanning direction.

Here, the first prism 21A is arranged, for example, more on a side to the incident surface 7a than the center of the light guiding body 7 in the main scanning direction, and preferably arranged between the incident surface 7a and a position of a distance ¼ of an entire length of the light guiding body 7.

The angle of the prism incident plane 21a in the first prism 21A is 90 to 145 degrees, for example. Here, the angle is an angle between the main scanning direction and a side face of the V-groove.

In addition, in the present embodiment, the reflector 22 is provided below the light guiding body 7 (on an opposite side to the document side) for reflecting light leaking from the light guiding body 7 to the document side, in an entire area in the main scanning direction. The light guiding body 7, the LED 6, and the reflector 22 that compose the illumination unit of the image reading apparatus 2 are supported reciprocatably in the vertical scanning direction (the direction vertical to the surface of the sheet of FIG. 2) by the carriage (not illustrated).

When a current is supplied to the LED 6, the LED 6 is activated and emits light. The light emitted from the LED 6 is incident to the inside of the light guiding body 7 through the incident surface 7a, and propagated in the main scanning direction while being reflected in the light guiding body 7.

Since the angle of the prism incident plane 21a of the first prism 21A in the vicinity of the LED 6 is configured to be greater than the angle of the prism anti-incident plane 21b, the light is refracted by the prism incident plane 21a of a greater angle of the prism 21A, emitted to the outside of the light guiding body 7, reflected by the reflector 22, and incident onto the light guiding body 7 again. As a result, loss of light energy is increased and illuminance is reduced in the vicinity of the LED 6, thereby making the illuminance distribution in the vertical scanning direction broader (see FIG. 4). Therefore, reduction in light intensity due to the document being spaced apart from the platen glass in the vicinity of the LED 6 is suppressed and variation in image density is thus reduced, thereby preventing image fogging caused in the image forming apparatus.

Figure 4:
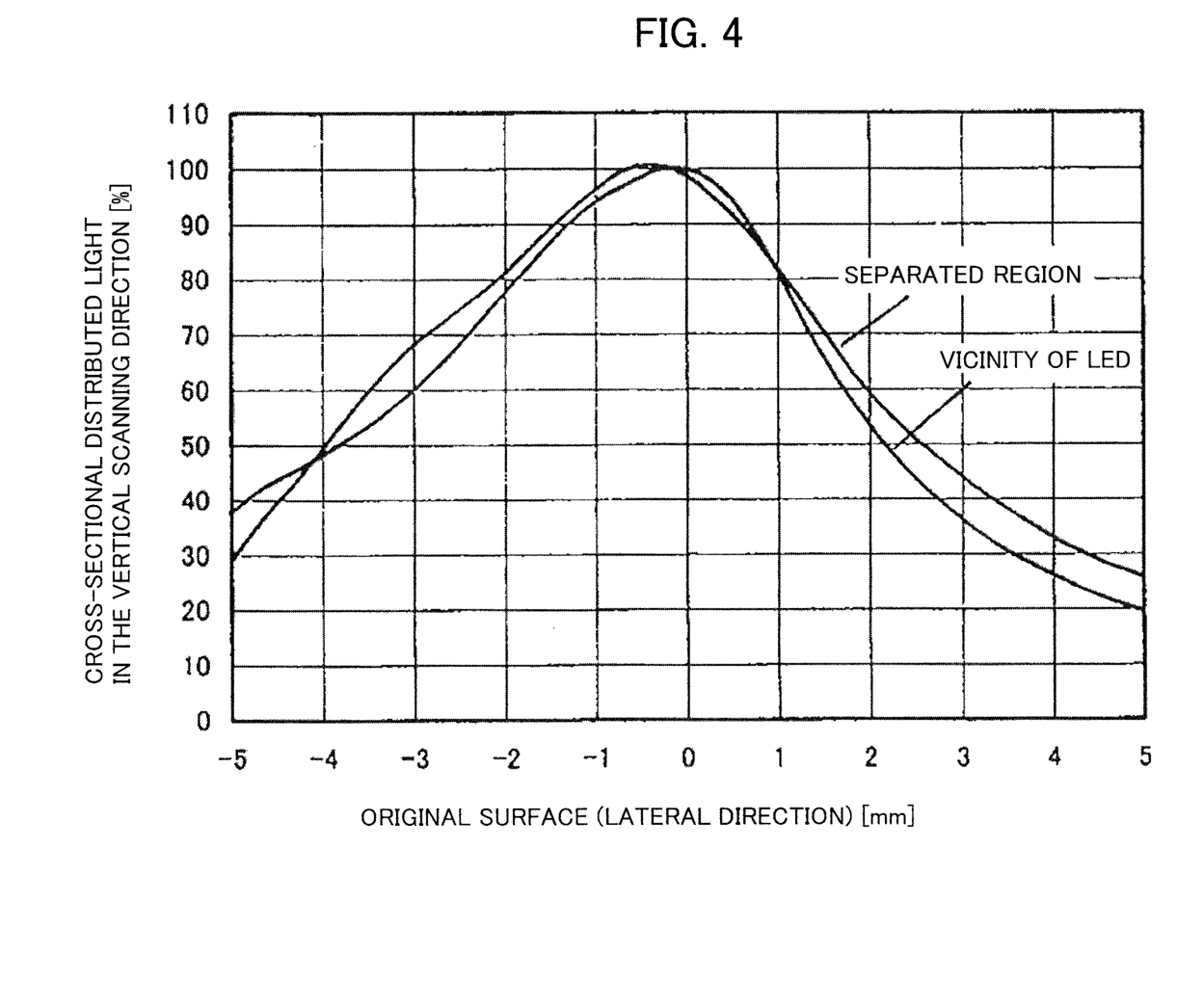
FIG. 4 is a diagram illustrating cross-sectional distributed light in the vertical scanning direction in the vicinity of the LED and in a separated region located away from the LED, in the image reading apparatus according to the present disclosure.

FIG. 4 shows cross-sectional distributed light in the vertical scanning direction at a predetermined position in the vicinity of the LED 6 and in a separated region on a second end side, located away from the LED 6. As apparent from comparison between the cross-sectional distributed light in the vertical scanning direction shown in FIG. 4 and the cross-sectional distributed light in the vertical scanning direction shown in FIG. 8, the illuminance distribution in the vertical scanning direction in the vicinity of the LED 6 becomes broader.

In a portion of the light guiding body 7 located away from the LED 6, as shown in FIG. 3B, since the light incident upon the light guiding body 7 is refracted by the prism incident plane 21a' of a smaller angle in the prism 21B and propagated in the light guiding body 7, loss of energy and loss of illuminance is reduced in the portion.

As described above, according to the present embodiment, in the image forming apparatus 1 (the image reading apparatus 2), since the angle of the prism incident plane 21a of the first prism 21A in the vicinity of the LED 6 with respect to the main scanning direction is configured to be greater than the angle of the prism anti-incident plane 21b with respect to the main scanning direction, the light incident upon the light guiding body 7 is refracted by the incident plane of a greater angle in the vicinity of the LED 6, emitted to the outside of the light guiding body 7, reflected by a reflector and the like, and incident onto the light guiding body 7 again. Therefore, in the image forming apparatus 1 (the image reading apparatus 2), illuminance of a region in the vicinity of the LED is reduced and the illuminance distribution in the vertical scanning direction becomes broader, thereby suppressing reduction in light intensity due to the document being spaced apart from the platen glass in the vicinity of the LED 6. As a result, in the image forming apparatus 1 (the image reading apparatus 2), variation in image density is reduced, thereby preventing image fogging. In the image forming apparatus 1 (the image reading apparatus 2), in a portion of the light guiding body 7 located away from the LED 6, since the light incident upon the light guiding body 7 is refracted by the prism incident plane 21a' of a smaller angle in the second prism 21B and propagated in the light guiding body 7, loss of energy and loss of illuminance is reduced in the portion.

In addition, in the image forming apparatus 1 (the image reading apparatus 2) of the present embodiment, the angle of the prism incident plane 21a with respect to the main scanning direction in the first prism 21A is the same as the angle of the prism anti-incident plane 21b' with respect to the main scanning direction in the second prism 21B. Furthermore, in the image forming apparatus 1 (the image reading apparatus 2), the angle of the prism anti-incident plane 21b with respect to the main scanning direction in the first prism 21A is the same as the angle of the prism incident plane 21a' with respect to the main scanning direction in the second prism 21B. In other words, in the image forming apparatus 1 (the image reading apparatus 2), a shape of the first prism 21A in the vicinity of the LED 6 is symmetric to a shape of the second prism 21B in the main scanning direction. Therefore, according to the present embodiment, in the image forming apparatus 1 (the image reading apparatus 2), only one tool bit is sufficient for manufacturing a die for forming the prism 21, thereby providing an effect of facilitating manufacturing process and reducing the manufacturing cost.

The image forming apparatus 1 shown in FIG. 1 provided with the image reading apparatus 2 according to the present disclosure can thus stably provide a high-quality image without fogging or the like.

This embodiment has described a disclosure as applied to a monochrome copying machine and to an image reading apparatus provided with the copying machine. However, it is obvious that this disclosure may be apply in the same manner also in relation to another arbitrary image forming apparatus such as a facsimile, multifunction peripheral, or the like in addition to the copying machine whether color or monochrome, and to an image reading apparatus provided with such a device.

The invention claimed is:

1. An image reading apparatus comprising: an LED (Light emitting diode) for illuminating a document;

a light guiding body disposed along a main scanning direction, the light guiding body including
an incident surface formed on a first end side and arranged to face the LED,
an emission surface formed on a document side to extend in the main scanning direction,
a plurality of prisms for diffusing light that is aligned in the main scanning direction on a side facing the emission surface of the light guiding body, the plurality of prisms including
at least one first prism that is disposed on an incident surface side in the main scanning direction, in which an angle of a prism incident plane with respect to the main scanning direction is greater than an angle of a prism anti-incident plane with respect to the main scanning direction, and
at least one second prism that is disposed on an opposite end side to the incident surface side in the main scanning direction, in which an angle of a prism incident plane with respect to the main scanning direction is smaller than an angle of a prism anti-incident plane with respect to the main scanning direction,
the light guiding body guiding light, which is emitted by the LED and incident upon the incident surface, in the main scanning direction and emitting the light from the emission surface; and
a photoelectric conversion element that reads an image of a document by converting the light emitted from the emission surface of the light guiding body and reflected by the document to an electric signal.

2. The image reading apparatus according to claim 1, wherein the first prism is disposed more to the incident surface side than a center in the main scanning direction of the light guiding body.

3. The image reading apparatus according to claim 1, wherein in the first prism, the angle of the prism incident plane with respect to the main scanning direction is 90 to 145 degrees.

4. The image reading apparatus according to claim 1, wherein: the angle of the prism incident plane with respect to the main scanning direction in the first prism is the same as the angle of the prism anti-incident plane with respect to the main scanning direction in the second prism; and
  the angle of the prism anti-incident plane with respect to the main scanning direction in the first prism is the same as the angle of the prism incident plane with respect to the main scanning direction in the second prism.

5. The image reading apparatus according to claim 1, wherein the plurality of prisms is composed of the plurality of first prisms and the plurality of second prisms.

6. An image forming apparatus comprising an image reading apparatus including:

an LED (Light emitting diode) for illuminating a document;
a light guiding body disposed along a main scanning direction, the light guiding body including
an incident surface formed on a first end side and arranged to face the LED,
an emission surface formed on a document side to extend in the main scanning direction,
a plurality of prisms for diffusing light that is aligned in the main scanning direction on a side facing the emission surface of the light guiding body, the plurality of prisms including
at least one first prism that is disposed on an incident surface side in the main scanning direction, in which an angle of a prism incident plane with respect to the main scanning direction is greater than an angle of a prism anti-incident plane with respect to the main scanning direction, and
at least one second prism that is disposed on an opposite end side to the incident surface side in the main scanning direction, in which an angle of a prism incident plane with respect to the main scanning direction is smaller than an angle of a prism anti-incident plane with respect to the main scanning direction,
the light guiding body guiding light, which is emitted by the LED and incident upon the incident surface, in the main scanning direction and emitting the light from the emission surface; and
a photoelectric conversion element that reads an image of a document by converting the light emitted from the emission surface of the light guiding body and reflected by the document to an electric signal.

7. The image forming apparatus according to claim 6, wherein the first prism is disposed more to the incident surface side than a center in the main scanning direction of the light guiding body.

8. The image forming apparatus according to claim 6, wherein in the first prism, the angle of the prism incident plane with respect to the main scanning direction is 90 to 135 degrees.

9. The image forming apparatus according to claim 6, wherein: the angle of the prism incident plane with respect to the main scanning direction in the first prism is the same as the angle of the prism anti-incident plane with respect to the main scanning direction in the second prism; and
  the angle of the prism anti-incident plane with respect to the main scanning direction in the first prism is the same as the angle of the prism incident plane with respect to the main scanning direction in the second prism.

10. The image forming apparatus according to claim 6, wherein the plurality of prisms is composed of the plurality of first prisms and the plurality of second prisms.

* * * * *